May 10, 1938.  A. K. BRUMBAUGH  2,117,016
CONTROL MECHANISM FOR AUTOMOTIVE VEHICLES
Filed July 29, 1932  4 Sheets-Sheet 1
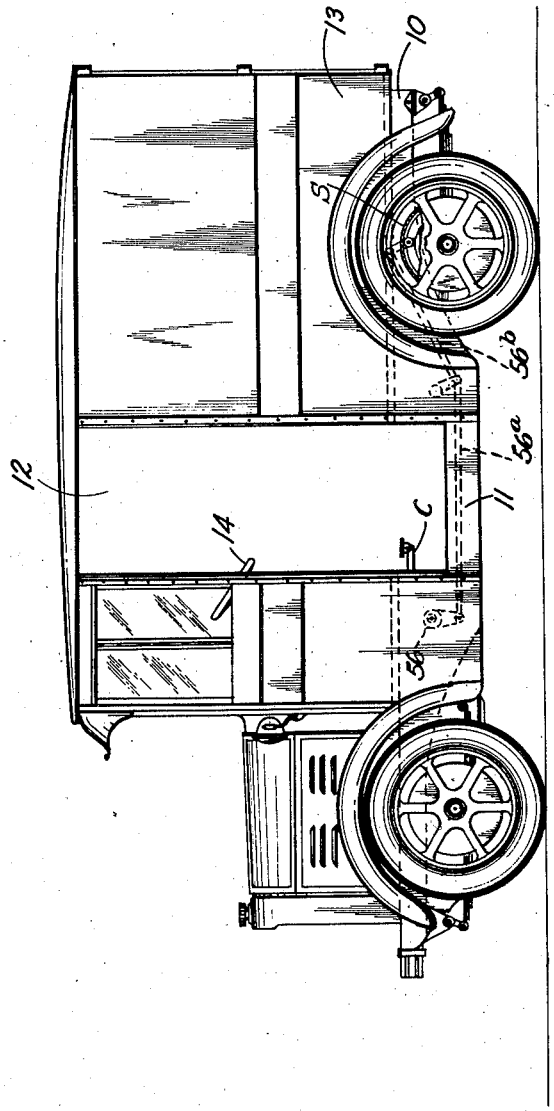
INVENTOR
ANDREW K. BRUMBAUGH
BY
Richey & Watts
ATTORNEYS

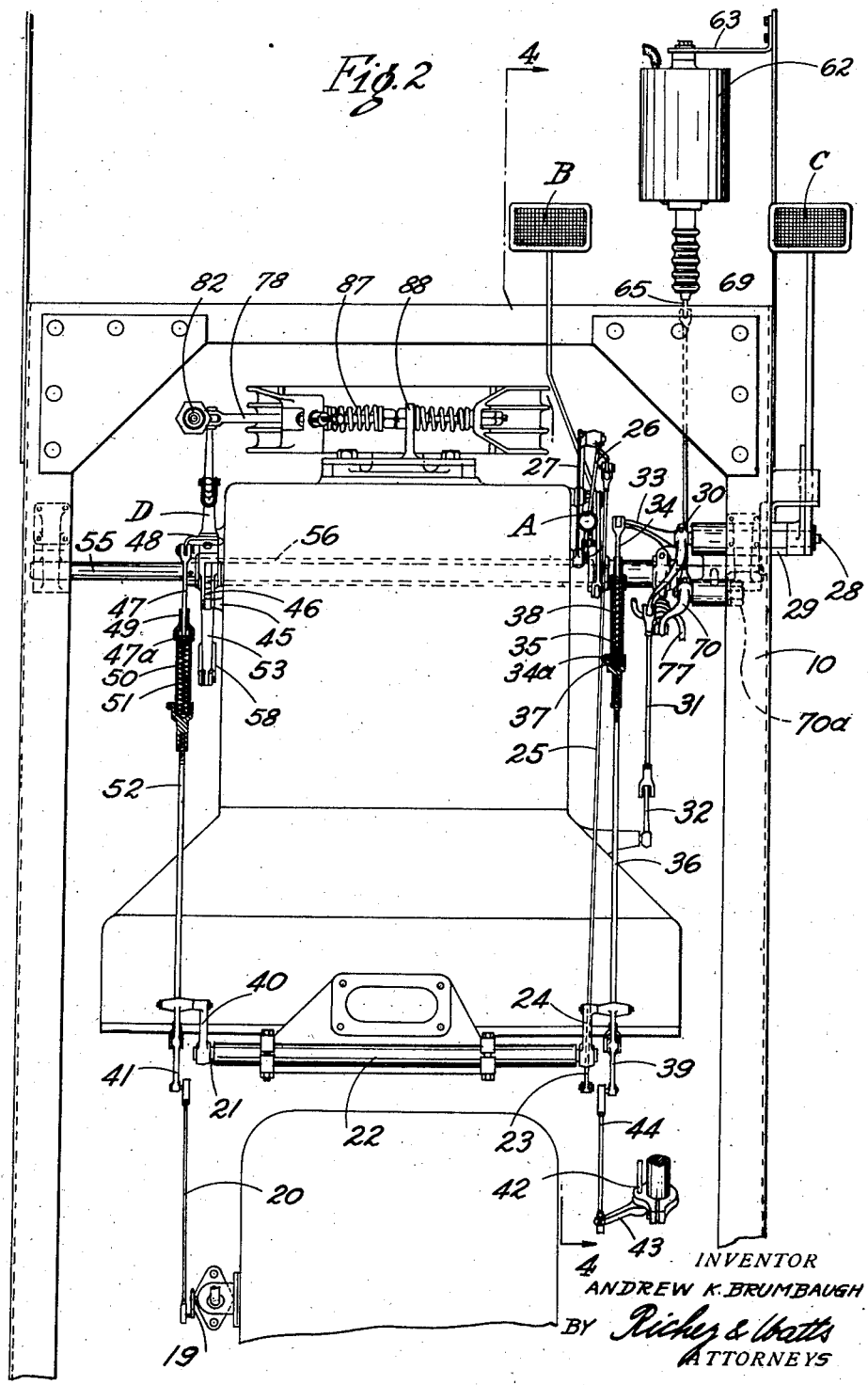

May 10, 1938.  A. K. BRUMBAUGH  2,117,016
CONTROL MECHANISM FOR AUTOMOTIVE VEHICLES
Filed July 29, 1932  4 Sheets—Sheet 3
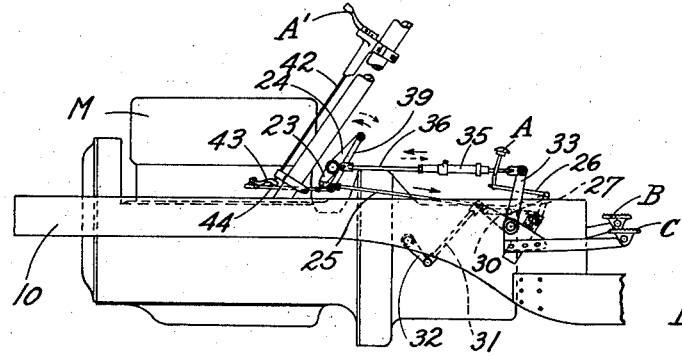
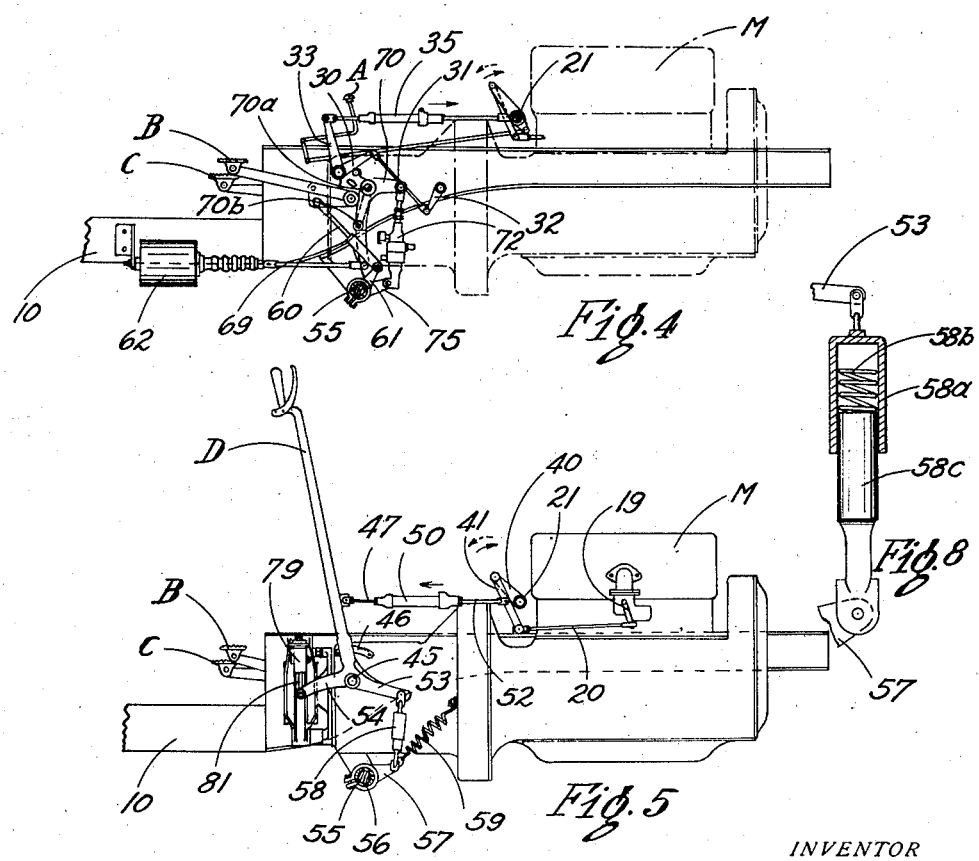
INVENTOR
ANDREW K. BRUMBAUGH
BY
Richey & Watts
ATTORNEYS

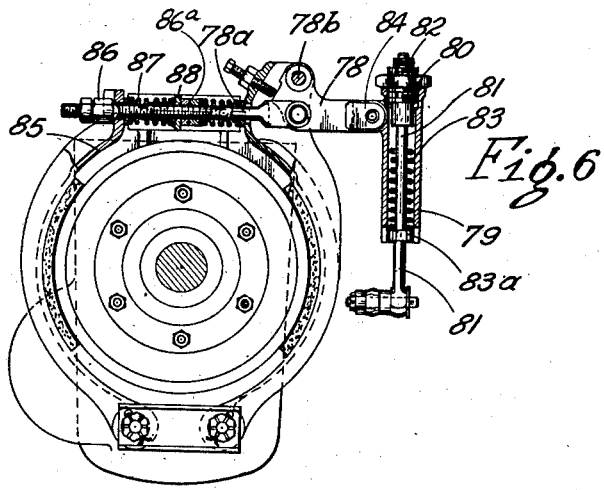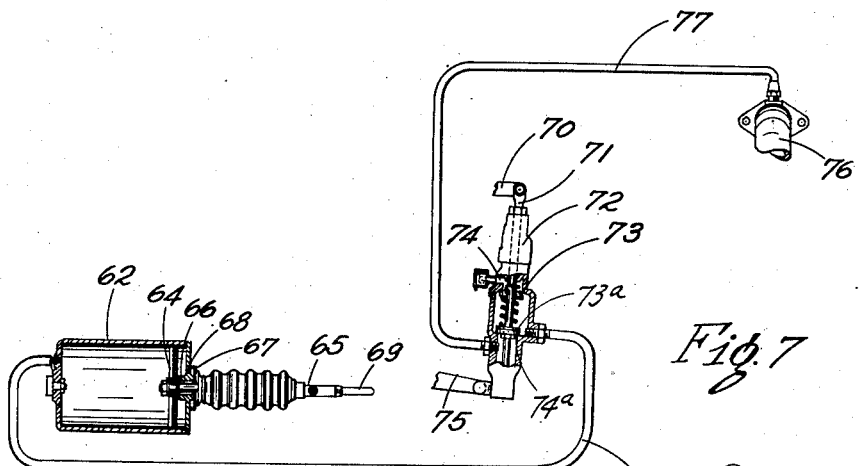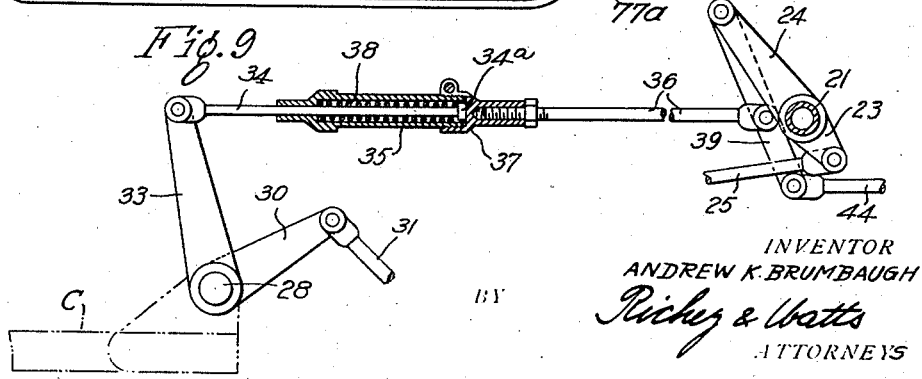

Patented May 10, 1938

2,117,016

UNITED STATES PATENT OFFICE 2,117,016

CONTROL MECHANISM FOR AUTOMOTIVE VEHICLES

Andrew K. Brumbaugh, Cleveland, Ohio, assignor to The White Motor Company, Cleveland, Ohio, a corporation of Ohio Application July 29, 1932, Serial No. 625,857

8 Claims. (Cl. 192—.01)

This invention relates to control mechanism for automotive vehicles and is particularly adapted for delivery trucks and like vehicles which are required to make a relatively large number of stops with relatively short runs between stops.

The primary object of the invention is to provide a safe and reliable system of control mechanism for vehicles of the above type which will facilitate the operation thereof.

With this object in view, the braking system and engine throttle are interconnected by linkage mechanism controlled by a lever or like member, preferably conveniently located with respect to the operator's cab, whereby when the lever is moved in a direction to apply the brakes, the throttle is retarded and the engine brought to idling speed, and when said lever is moved in a direction to release the brakes, the throttle is advanced and the engine brought to a predetermined driving speed. This lever or like member may be considered in the nature of a combined throttle and brake control lever, since there is a certain adjustable range of lever movement which is lost motion with respect to the braking action, or which does not affect the latter action, but which does act on the throttle lever. In conjunction with the foregoing feature, the engine throttle is also operatively connected with the clutch pedal in a manner such that when the clutch is released, the throttle is retarded and the speed of the engine decelerated to facilitate the gear-shifting operation, and when the clutch is engaged, the throttle is advanced and the speed of the engine accelerated to take care of the load. A main throttle control member, preferably a hand lever mounted on the steering column, is provided, which determines the range of acceleration of the combined brake and throttle lever. Thus the driver of the vehicle may set this latter lever to a point commensurate with the load and speed of travel desired to be attained, and then operate the vehicle with the combined brake and throttle lever in conjunction with the clutch pedal.

The present invention may be considered in the nature of an improvement with respect to that disclosed in my prior copending application, Serial No. 493,588, filed November 5, 1930.

The advantages incident to the foregoing briefly outlined control mechanism will be rendered more apparent in view of the following description taken in conjunction with the drawings, wherein:—

Figure 1 is a side elevation of a vehicle constructed in accordance with this invention;

Fig. 2 is a top plan view of the control elements showing their relation to other parts of the vehicle;

Fig. 3 is a side elevation of a portion of the vehicle showing particularly the control elements;

Fig. 4 is a view taken substantially on the line 4—4, Fig. 2 looking in the direction indicated by the arrows, the parts being reduced in size relatively to Fig. 2 to conserve space;

Fig. 5 is a view looking in the same direction as Fig. 4, showing the control elements on the opposite side of the vehicle;

Fig. 6 is a detailed sectional view through a part of the brake mechanism;

Fig. 7 is a view of a booster assembly for the brakes detached from the vehicle; and Fig. 8 is a detail view of a connecting member used in the brake system.

Referring to the drawings, I have shown in Fig. 1 a delivery vehicle which, briefly stated, comprises a chassis frame 10 having an intermediate depressed portion 11, at which point a compartment 12 is provided in which the driver or operator may stand. The body 13 is constructed to provide a load space in rear of the compartment 12, and the latter as here shown is open across the entire width of the body. Arranged at the front of the compartment are the controls for the vehicle, which include a steering wheel 14, a clutch pedal C, a service brake pedal B, (refer to Figs. 2 to 5, inclusive) an accelerator pedal A and an accelerator lever A', all of which are located within convenient reach of a driver in the compartment 12.

An internal combustion engine M supplies the motive power of the vehicle and is provided with the usual throttle valve disposed in the fuel mixture supply line and controlled by an arm 19, the latter being connected by a link 20 with the throttle control linkage mechanism which operatively connects the throttle arm 19 with the clutch pedal C, foot accelerator A, hand accelerator A' and the combined brake and throttle lever to be described.

In the example shown, this linkage mechanism comprises a rock shaft 21, which is rotatably mounted in a sleeve 22 fixed to the fly wheel housing of the engine. At its one end, the shaft 21 has fixed thereon a lever provided with a pair of opposed arms 23 and 24. The arm 23 is pivotally connected to the one end of a link 25 and the latter connects with the one arm of a bell crank 26, which is pivotally anchored to a bracket 27 secured to the transmission housing, the foot accelerator A being mounted on the other arm of the said bell crank.

The clutch pedal C is connected to the throttle arm 19 in a manner such that when the pedal is depressed and the clutch released, the engine is retarded to idling speed to facilitate the gear shifting operation, and when said pedal is released, the engine speed is increased to take care of the load. The pedal C is fixed on the one end of a shaft 28, which is rotatably mounted in a bracket sleeve 29, the opposite end of said shaft having fixed thereon an arm 30 which is pivotally connected to a link rod 31, in turn pivotally connected to an arm 32 secured on the end of the clutch-operating shaft.

Secured on the inner end of the shaft 28 is another arm 33 which is pivotally connected to a yoke link 34, provided with a head 34a, the said yoke link extending into a sleeve 35. This sleeve is secured on the rearward end of a link 36 by means of a head 37 and houses a spring 38 which is positioned on link 34 between head 34a and the rear end of sleeve 35. Link 36 is pivotally connected at its forward end to a floating lever 39 which is in turn pivotally connected at one end to the arm 24 on the one end of the rock shaft 21.

The opposite end of rock shaft 21 has fixed thereon an arm 40 which is pivotally connected to the one end of a floating lever 41, the opposite end of said arm being pivoted to the throttle link 20. The hand throttle lever A' connects with the floating lever 39 through shaft 42, arm 43 and link 44.

It will be seen that when the clutch pedal C is depressed, link 34 exerts a yielding pull on link 36, which is connected through arms 39 and 24, rock shaft 21, arm 40, lever 41 and link 20 to the throttle arm 19, turning the latter in the direction indicated by the dotted line arrow and retarding the throttle, spring 38 compensating for any pull beyond the limit of retardation. When the said pedal is released, the throttle arm is returned to its original position, opening the throttle as the clutch moves into engagement, thereby increasing the power delivered by the engine as the load is applied. If the clutch pedal is depressed when the hand throttle lever A' is in retarded position, spring 38 is merely compressed without moving the throttle. When the clutch is re-engaged, the hand throttle lever, or foot accelerator A, should be advanced in the conventional manner to prevent stalling of the engine.

The combined brake and throttle lever hereinbefore referred to is indicated at D and is pivotally anchored to the transmission housing by means of a pin 45. The lever is provided with a pawl adapted to engage a toothed segment 46, when it is desired to set the lever.

This lever D is operatively connected to the throttle arm 19 by means of a link 47, which is pivotally connected at one end to a bracket 48 secured to said lever, and at its opposite end extends through a sleeve head 49 and is provided with a head 47a. Sleeve head 49 is threaded on a sleeve 50 which houses a spring 51 and connects with a link rod 52 which in turn is pivotally connected to the floating lever 41.

It will be seen that when lever D is moved forward, the head 47a on link 47 tends to compress the spring 51 and exert a yielding push on the link 52 and, through lever 41 and link 20, to retard the throttle, the limit of retardation being compensated for by spring 51. When the said lever is moved in a rearward direction, a pull is exerted on link 52 and the throttle is advanced, the action in this instance being positive.

It will also be seen that the advance of the throttle by lever D may be definitely limited over a certain range by setting the hand lever A', since the latter lever has a positive connection with the throttle arm 19, while lever D has a yielding connection with respect to said arm. Thus the hand throttle lever A' may be adjusted to determine the range of throttle advance of lever D, and thereafter the throttle may be controlled by the latter lever, the speed of the vehicle being held within the limit set by lever A'. Lever A' also determines the limit of acceleration of clutch pedal C, and controls the throttle operating function of the pedal C when changing gears. One advantage of this latter feature is that the range of throttle advance of the clutch pedal may be adjusted to take care of varying loads imposed on the motor in starting. For example, when starting on an upgrade, lever A' may be adjusted to advance the upper limit of the pedal C to take care of the increased load on the motor. Lever D may also be used as a brake lever, as will be apparent in view of the construction which will now be described.

The lever D in the ebodiment shown is formed with arms 53 and 54. Arm 53 is operatively connected, through mechanism to be described, to the service brakes of the vehicle (not shown) and arm 54 to propellor shaft brake, or what is commonly termed the emergency or parking brake of the vehicle. The brakes may be of the mechanical type or of the hydraulic or fluid pressure type, as desired. In the present instance, the braking action is aided by a booster operating through suction pressure from the manifold.

First considering the service brake connections, 55 is a cross shaft which is mounted at opposite ends in brackets carried by the frame 10, and 56 is a sleeve rotatably mounted on said shaft. Arm 53 of lever D connects with a lever 57 secured on the one end of sleeve 56 through a lost-motion link member generally indicated at 58 and shown in detail in Fig. 8. As shown this member comprises a cylinder 58a, which houses a spring 58b and is connected to the arm 53, and a contact member in the form of a plunger or piston 58c which has a sliding fit in said cylinder. The travel of the cylinder 58a prior to contacting the spring 58b and exerting braking pressure on piston 58c covers the range of throttle action of lever D before the brakes are applied. A spring 59 normally urges the sleeve 56 and related parts to their original positions.

The brake pedal B is connected to the opposite end of sleeve 56 (note Fig. 4) through the medium of a link 60 and a lever 61.

The service brakes, one of which is generally indicated at S in Fig. 1, may be operatively connected to sleeve 56 in any suitable manner, such as by linkage mechanism indicated at 56a and 56b.

To reduce the effort involved in applying the brakes, the booster assembly shown in detail in Fig. 7 is provided and connected into the system as illustrated in Figs. 2 and 4. A power cylinder 62 is attached to the frame 10 by means of a bracket 63. A piston 64 is mounted in the cylinder and has connected thereto rod 65 which is mounted to slide through a drilled boss 66 having fitted thereon a cap 67. Exhaust ports 68 are formed adjacent the boss 66 and through cap 67. A link 69 is pivotally connected at one end to rod 65 and at its opposite end connects with the one arm of a bell crank lever 70 mounted on a stub shaft 70a, the other arm of said lever being connected to the valve stem 71 of a valve 72. Also secured on shaft 70a is a lever or arm 70b (see Fig. 4) which connects to brake linkage mechanism not shown. Valve stem 71 is provided with a resiliently mounted closure member 73 adapted to close port 74. The lower end of the valve 72 is pivotally supported by a bracket 75 secured on the sleeve 56.

Cylinder 62 is operated in the present instance by suction pressure from the manifold 76, conduits 77 and 77a connecting the cylinder with the manifold through valve 72. When the sleeve 56 is turned a certain predetermined amount by the hand lever D or the foot pedal B, a downward pull is exerted on valve 72 which is transmitted through valve stem 71, arm 70 and stub shaft 70a to lever 70b, and since this lever is connected to the brakes, it progressively resists this pull as the brakes are applied, causing valve closure member 73 to close port 74 and valve closure member 73a to open port 74a, whereupon suction is set up in cylinder 62, with the result that the piston 64 tends to move rearwardly, and through the rod 65, link 69 and lever 70 acts on the said sleeve to augment the brake pressure. When manual braking pressure is released, the port 74 is opened to the atmosphere and port 74a closed and piston 64 returns to its normal position, exhausting through port 68. It will be understood that there is a follow-up action of the casing of valve 72 as the brake is applied which controls the suction pressure in cylinder 62 in a manner such as to maintain a suction pressure proportionate to the manual braking pressure.

Fig. 6, taken in conjunction with Fig. 5, shows the connections between lever D and the propeller shaft brake. This brake in the example shown is operated by means of toggle links 78 and 78a, link 78 being pivotally anchored at 78b and having pivotally connected thereto lost-motion linkage mechanism comprising a housing or sleeve 79, a contact and guide member 80 fixed in the upper end of the sleeve, a rod 81 having a sliding fit in said guide member, a spring 83, and a contact nut or lug 83a fixed on the rod and adapted to engage said spring. The housing 79 is pivotally connected by a pin 84 to the link 78, and the rod 81 is pivotally connected at its lower end to the arm 54 of lever D. Toggle link 78a is projected through the adjacent free ends of the brake band 85 and adjustably anchored by nut 86. Return springs 87 are mounted on link 78a together with adjusting nuts 86a. A stationary abutment 88 is also provided.

It will be seen that when lever D is pushed forward, it first retards the throttle without affecting the brakes, since there is a certain range of lost-motion with respect to the brakes. Upon continued forward movement of the lever, cylinder 58a exerts pressure thru spring 58b on contact plunger 58c, which rotates sleeve 56, and the service brakes are thus applied with a gradually-increasing pressure. Arm 54 of lever D acts simultaneously to push rod 81 and contact lug or nut 83a upwardly, and when the spring 83 reaches the contact member 80, a gradually-increasing pressure is exerted on link 78, which rotates about its pivot 78b and sets the propeller shaft brakes. The linkage mechanism is preferably arranged to time this action so that the service brakes and the propeller shaft brakes will be applied in consecutive order, or one may be timed with respect to the other as desired. Also, the range of throttle action of lever D may be adjusted and timed with respect to the brake action. When the lever D is released and pulled back, the brakes are released and the throttle advanced.

Obviously the manner of operating the vehicle may be varied within certain limits in accordance with the preference of the operator or driver.

In making deliveries, the preferred method of operation is to set the hand lever A' at a position which will give a desired top speed, and control the speed of travel through the medium of the lever D. In starting the vehicle, the operator depresses clutch pedal C and pulls back on lever D, releasing the emergency and service brakes in consecutive order, the throttle being held in retarded position by the clutch pedal. The gears are then shifted in the conventional manner, the throttle-control action of the clutch pedal alternately advancing and retarding the throttle as the clutch is engaged and released. In stopping the vehicle, the clutch pedal is depressed and lever D pushed forward, decelerating the motor and applying the service and emergency brakes in the order named.

What I claim is:

1. In an automotive vehicle, the combination comprising, an engine and a throttle therefor, wheel and propeller shaft brakes, a manually operable lever for regulating the throttle and actuating said brakes, and linkage mechanism operatively connecting said lever with said throttle and the brakes, the linkage mechanism connecting said lever with said brakes embodying a lost motion device to permit a range of throttle control without affecting the braking action.

2. In an automotive vehicle, the combination comprising an engine and a throttle therefor, brakes, a main hand throttle lever, a combined brake and throttle lever, linkage mechanism connecting said latter lever with said brakes and embodying a lost motion connection to provide a range of throttle control independent of braking action, linkage mechanism common to both of said levers connecting them to the throttle and embodying a resilient connection with respect to the combined brake and throttle lever whereby the setting of the main hand lever limits the throttle advance of said combined brake and throttle lever.

3. In an automotive vehicle, the combination comprising, an engine and a throttle therefor, emergency brakes and service brakes, a hand lever, linkage mechanism connecting said hand lever with said throttle, and also with said emergency and service brakes, and lost-motion devices interposed in the brake linkage mechanism whereby said lever is permitted a range of throttle control without applying the brakes, said lever when moved in one direction retarding the throttle and setting the service and emergency brakes in the order named.

4. In an automotive vehicle, the combination comprising, an engine and a throttle therefor, a propeller shaft, a brake on said shaft, a hand lever, linkage mechanism connecting said hand lever with said throttle and also with said brake, and a lost-motion device interposed in the brake linkage mechanism whereby said lever is permitted a range of throttle control without applying the brakes.

5. In an automotive vehicle, the combination comprising an engine and a throttle therefor, brakes and a clutch, a lever for actuating said clutch, a main throttle lever, a lever for actuating said brakes and for controlling said throttle arranged to control said throttle throughout its entire range of movement, linkage mechanism operatively connecting all of said levers with said throttle, linkage mechanism connecting said last named lever with said brakes embodying an amount of lost motion with respect to said brakes sufficient to permit the aforesaid range of throttle control by said last named lever, and means associated with said first named linkage mechanism whereby setting of said main throttle lever limits the throttle advance of the combined brake and throttle lever.

6. In an automotive vehicle, the combination comprising, an engine and a throttle therefor, brakes and a clutch, a hand lever for actuating said brakes and for controlling said throttle arranged to control said throttle throughout its entire range of movement, linkage mechanism connecting said hand lever with said throttle, linkage mechanism connecting said hand lever with said brakes embodying an amount of lost motion with respect to said brakes sufficient to permit the aforesaid range of throttle control by said lever acting through the first named linkage, a lever for actuating said clutch, linkage mechanism connecting said second mentioned lever with said first named linkage mechanism through which movement of said second mentioned lever to release and engage said clutch is communicated to said first named linkage mechanism to retard and advance the throttle in the order named, and means for limiting throttle advance by said hand lever.

7. In an automotive vehicle, the combination comprising, an engine and a throttle therefor, brakes and a clutch, a hand lever for actuating said brakes and for controlling said throttle arranged to control said throttle throughout its entire range of movement, said lever extending upwardly from the floor of the vehicle to a convenient height for operation by the driver in a standing position, linkage mechanism connecting said lever with said throttle, linkage mechanism connecting said hand lever with said brakes embodying an amount of lost motion with respect to said brakes sufficient to permit the aforesaid range of throttle control by said hand lever acting through said first named linkage mechanism, a pedal for actuating said clutch mounted near the floor of said vehicle in a convenient position for operation by the foot of the driver, and linkage mechanism connecting said pedal with said first named linkage through which movement of said pedal to release and engage the clutch is communicated to said first named linkage mechanism to retard and advance the throttle in the order named.

8. In an automotive vehicle, the combination comprising, an engine and a throttle therefor, brakes and a clutch, a hand lever for actuating said brakes and for controlling said throttle arranged to control said throttle throughout its entire range of movement, linkage mechanism connecting said hand lever with said throttle, linkage mechanism connecting said hand lever with said brakes embodying an amount of lost motion with respect to said brakes sufficient to permit the aforesaid range of throttle control by said lever acting through the first named linkage, a lever for actuating said clutch, and linkage mechanism connecting said second mentioned lever with said first named linkage mechanism through which movement of said second mentioned lever to release and engage said clutch is communicated to said first named linkage mechanism to retard and advance the throttle in the order named.

ANDREW K. BRUMBAUGH.